United States Patent [19]

Maria de Kort et al.

[11] Patent Number: 4,957,767
[45] Date of Patent: Sep. 18, 1990

[54] METHOD OF MAKING A NON-ALCOHOLIC BEER CONTAINING SPRAY-DRIED WORT

[75] Inventors: Andrianus H. Maria de Kort, Uithoorn; Paul van Erede, Zoetermeer, both of Netherlands

[73] Assignee: Heineken Technisch Beheer B.V., Amsterdam, Netherlands

[21] Appl. No.: 241,076

[22] Filed: Sep. 6, 1988

[30] Foreign Application Priority Data

Sep. 8, 1987 [NL] Netherlands .................. 8702126

[51] Int. Cl.$^5$ .................................................. A23L 2/38
[52] U.S. Cl. ...................................... 426/590; 426/16; 426/29
[58] Field of Search ............... 426/592, 16, 29, 64, 426/590

[56] References Cited

U.S. PATENT DOCUMENTS

| 2,440,276 | 4/1948 | Klein | 426/16 |
| 2,830,904 | 4/1958 | Arentoft | 426/16 |
| 3,113,029 | 12/1963 | Hernandez . | |
| 3,149,052 | 9/1964 | Kneen | 426/16 |
| 3,594,179 | 7/1971 | Korolev | 426/29 |
| 3,875,303 | 4/1975 | Hieber | 426/16 |
| 4,004,034 | 1/1977 | Delhaye | 426/29 |
| 4,305,963 | 12/1981 | Nakagawa | 426/16 |
| 4,661,355 | 4/1987 | Schur | 426/16 |
| 4,666,719 | 5/1987 | Lowery et al. | 426/13 |
| 4,746,518 | 5/1988 | Schur | 426/16 |
| 4,765,993 | 8/1988 | Owades | 426/64 |

FOREIGN PATENT DOCUMENTS 2145298 3/1973 Fed. Rep. of Germany .
6805092 10/1969 Netherlands .
7006659 11/1970 Netherlands .
15533 of 1914 United Kingdom .

Primary Examiner—Carolyn Paden
Attorney, Agent, or Firm—Amster, Rothstein & Ebenstein

[57] ABSTRACT

The invention relates to non-alcoholic beer, comprising unfermented wort reconstituted with water from wort powder, and carbon dioxide, said wort powder being spray-dried wort.

15 Claims, No Drawings

METHOD OF MAKING A NON-ALCOHOLIC BEER CONTAINING SPRAY-DRIED WORT

BACKGROUND OF THE INVENTION

This invention relates to a non-alcoholic beverage with flavour properties comparable to those of conventionally brewed beer, said beverage being referred to herein and in the claims as a non-alcoholic beer. The term non-alcoholic is used to indicate that no alcohol production has taken place by fermentation and no alcohol has been added. However, this does not exclude the presence of minute amounts of alcohol originating from flavorants. The term "non-alcoholic" in this connection should therefore be interpreted as containing not more than 0.1% by volume of alcohol.

The interest in non-alcoholic beer can be explained on many grounds, including legislative restrictions with respect to the use of alcohol, e.g. in connection with traffic, religion, and reduction in the quantity of calories consumed.

When making non-alcoholic beer, a number of methods can be employed. The major methods therefor are inhibition of alcohol formation and the removal of the alcohol after the fermentation. Both methods have the drawback that a product is obtained that has no attractive flavour on account of the presence of a wortlike off-flavour, in the first case, or the absence of the characteristic beer, in the second flavour.

British patent No. 15,533 A.D.1913 describes the application of dried wort for preparing a beerlike beverage. This method has not found acceptance in actual practice, which is probably due to the imperfect flavour of the resulting product.

SUMMARY OF THE INVENTION

The present invention provides a non-alcoholic beer having a typical full beer flavour, on the one hand, and being substantially devoid of the off-flavour originating from the starting material, the wort, on the other.

The beer according to the present invention is accordingly characterized in that it is based substantially on unfermented wort reconstituted from spray-dried wort powder and carbon dioxide.

An essential condition for the product of the present invention is that the basis of the non-alcoholic beer is formed by unfermented, water-reconstituted wort from spray-dried wort powder. For it has surprisingly been found that this product, possibly in combination with flavorants, such as hop oil, provides a good beer flavour, without the typical wortlike off-flavour, wherein, however, no fermentation of the wort has taken place, either prior to the preparation of the wort powder or after the reconstitution to wort.

In addition to the main component of the beer, the reconstituted, spray-dried wort powder, the beer according to the present invention naturally contains carbon dioxide. In order to further complete the flavour, according to the present invention, 0.01 to 5% by weight of other substances may be added as well. Examples thereof are flavorants, coloring agents, pH adjusting agent and foam stabilizer. The foam stabilizer is present preferably because the foam is less well stabilized due to the absence of alcohol. Conventional foam stabilizers are known in the literature. Naturally, in this case ethanol does not fall under the term foam stabilizer.

If necessary, lactic acid may for instance be added as pH adjusting agent for adjusting the desired pH of the beer.

The wort powder used according to the present invention is a commercially available product, which may be obtained by processing wort concentrate of a suitable dry matter content to form a powder by means of spray-drying, said powder having a moisture content of maximally 5% by weight.

The preparation of the beer according to the present invention can be effected in a simple manner by mixing the components to the desired contents in the final product. For this purpose, a dry matter content of 2.5 to 6% by weight of the wort in the final product is preferred. In the event that a haze occurs in the liquid when the wort powder is being dissolved in water, said liquid may be filtered.

DESCRIPTION OF THE PREFERRED EMBODIMENTS

The present invention is further illustrated in and by the following examples, but is not limited thereto.

EXAMPLES I-III

The components mentioned in the Tables were mixed with each other, filtered and carbonated.

The wort powder was obtained by concentrating and spray-drying Pilsener wort of a higher bitterness and colour than normal wort.

Example I

TABLE A

| | |
|---|---|
| Wort powder (100% dry matter) | 4.0 kg |
| Lactic acid solution (10% by weight) | 100.0 ml |
| Water made up to | 100 l |

There was thus obtained a non-alcoholic beer having a good flavour, without off-flavours, of a neutral Pilsener type.

The beer has a dry matter content of 4.0% by weight, a colour of 7.0 EBC and a bitterness of 20.0 EBE.

Example II

TABLE B

| | |
|---|---|
| Wort powder (100% dry matter) | 5.0 kg |
| Unfermentable sugars (100% dry matter) | 1.0 kg |
| Lactic acid solution (10% by weight) | 125.0 ml |
| Water made up to | 100 l |

The resulting beer had a fuller flavour than the beer according to Example I. This, too, had no off-flavours. The extract content was 6.0% by weight, the colour 8.5 EBC and the bitterness 22.0 EBE.

Example III

TABLE C

| | |
|---|---|
| Wort powder (100% dry matter) | 4.0 kg |
| Lactic acid solution (10% by weight) | 100.0 ml |
| Natural hop aroma | 20.0 ml |
| Water made up to | 100 l |

There was thus obtained a non-alcoholic beer of the hoppy Pilsener type without off-flavours, having an extract content of 4.0 by weight, a colour of 7.0 EBC and a bitterness of 20.0 EBE.

I claim:

1. Non-alcoholic beer, comprising unfermented wort reconstituted with water from wort powder, said wort powder being spray-dried wort having a maximum moisture content of 5% by weight, said reconstituted unfermented wort being free of the wortlike or green flavor characteristic of conventional wort-based non-alcoholic beers.

2. Beer as claimed in claim 1, characterized in that the reconstituted, unfermented wort has a dry matter content of 2.5-6% by weight.

3. Beer as claimed in claim 1, characterized in that it also contains 0.01-5% by weight of additives.

4. Beer as claimed in claim 3, characterized by the additives being selected from flavorants, coloring agents, pH adjusting agent and foam stabilizer.

5. Beer as claimed in claim 3, characterized in that it contains hop oil.

6. Beer as claimed in claim 3, characterized in that said wort powder has a dry matter content of 100% by weight.

7. A method of making a non-alcoholic beer comprising unfermented wort, comprising the steps of providing wort powder formed of spray-dried wort and having a maximum moisture content of 5% by weight, and reconstituting the wort powder with water to form unfermented wort.

8. The method as claimed in claim 7, characterized in that the reconstituted unfermented wort has a dry matter content of 2.5-6% by weight.

9. The method as claimed in claim 7, characterized in that 0.01-5% by weight of additives are added to the water and wort powder.

10. The method as claimed in claim 9, characterized by the additives being selected from flavorants, coloring agents, pH adjusting agents and foam stabilizers.

11. The method as claimed in claim 9, characterized in that the additives include hop oil.

12. The method as claimed in claim 9, characterized in that the wort powder has a dry matter content of 100% by weight.

13. The method as claimed in claim 7, characterized in that the unfermented wort is free of the wortlike or green flavor characteristic of conventional wort-based non-alcoholic beers.

14. A non-alcoholic beer made by the process of claim 7.

15. A method of making a non-alcoholic beer comprising unfermented wort free of the wortlike or green flavor characteristic of conventional wort-based non-alcoholic beers, comprising the steps of
  (A) providing wort powder formed of spray-dried wort and having a dry matter content of 100% by weight;
  (B) reconstituting the wort powder with water to form unfermented wort having a dry matter content of 2.5-6% by weight; and
  (C) adding 0.01-5% by weight of additives to the water and wort powder, the additives including hop oil and others selected from flavorants, coloring agents, pH adjusting agents, foam stabilizers and mixtures thereof.

* * * * *

UNITED STATES PATENT AND TRADEMARK OFFICE
CERTIFICATE OF CORRECTION

PATENT NO. : 4,957,767

DATED : September 18, 1990

INVENTOR(S) : Adrianus H. Maria de Kort, et al.

It is certified that error appears in the above-identified patent and that said Letters Patent is hereby corrected as shown below:

On the title page:
Name of inventors in header - Delete "Maria"

Entry [75] - Change "Andrianus" to --Adrianus--;
 Change "Erede" to --Eerde--.

Signed and Sealed this

Thirteenth Day of October, 1992

*Attest:*

DOUGLAS B. COMER

*Attesting Officer*     *Acting Commissioner of Patents and Trademarks*